Figure 1:
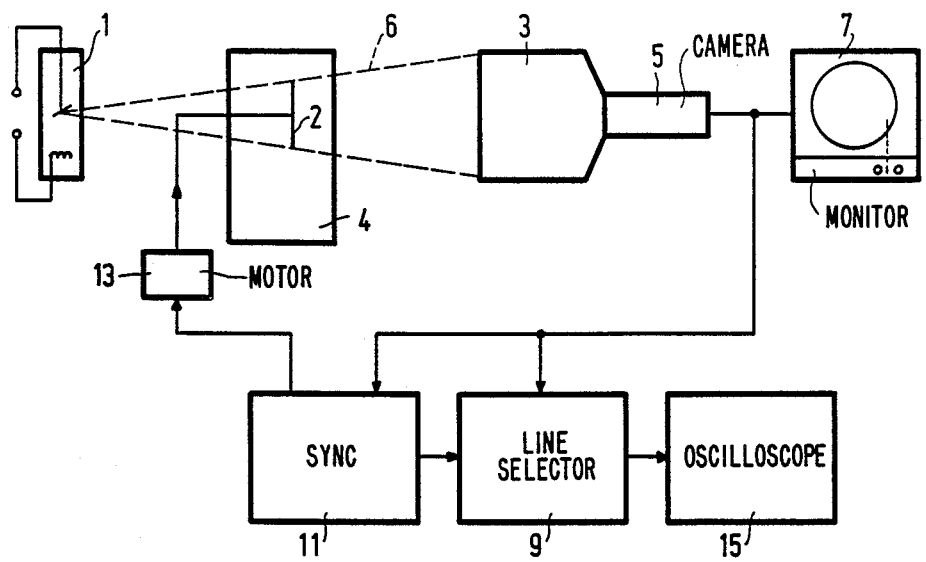

United States Patent [19]

Kroon et al.

[11] Patent Number: 4,894,851
[45] Date of Patent: Jan. 16, 1990

[54] METHOD OF AND DEVICE FOR MEASURING IMAGE LAG IN X-RAY SYSTEM

[75] Inventors: Johannes N. Kroon; Franciscus Schmal, both of Eindhoven, Netherlands

[73] Assignee: U.S. Philips Corporation, New York, N.Y.

[21] Appl. No.: 337,500

[22] Filed: Apr. 13, 1989

[30] Foreign Application Priority Data

Apr. 27, 1988 [NL] Netherlands .................. 8801094

[51] Int. Cl.$^4$ ............................................. G01D 18/00
[52] U.S. Cl. .......................................... 378/99; 378/207
[58] Field of Search ................... 378/99, 207; 358/111

[56] References Cited

U.S. PATENT DOCUMENTS 4,541,107 9/1985 Ciossi ..................................... 378/99

Primary Examiner—Craig E. Church
Attorney, Agent, or Firm—Jack E. Haken

[57] ABSTRACT

In X-ray systems in which a beam of X-rays radiates through an object to be examined and is converted by an image intensifier into a light image, blur occurs in said image due to the image lag of the X-ray system to moving objects. In order to measure the image lag of X-ray systems in a simple, objective and reproducible manner in operating conditions, a rotating disc having a coiled X-ray absorbing pattern is arranged between the X-ray source and the image intensifier. A number of dark lines then travels at a uniform speed over a strip-shaped horizontal part of the picture produced by the image intensifier comprising the centre of the disc. When a video camera is coupled to the image intensifier the image lag of the X-ray system can be determined from the ratio of the amplitudes of the video signal of an image line situated in the said part of the image with a rotating disc and with a stationary disc.

8 Claims, 3 Drawing Sheets

METHOD OF AND DEVICE FOR MEASURING IMAGE LAG IN X-RAY SYSTEM

The invention relates to a method of measuring image lag in an X-ray system comprising an X-ray source, an image intensifier and a video camera, in which a disc having a pattern of comparatively strongly and comparatively weakly X-ray-absorbing areas is placed between the X-ray source and the image intensifier with its axis substantially parallel to the axis of an X-ray beam emitted by the X-ray source, which disc is made to rotate about its axis, and in which the image lag of the X-ray system is determined from the output signal of the video camera.

The invention also relates to a measuring device for measuring image lay in an X-ray system which comprises an X-ray source, an image intensifier and a video camera, which measuring device comprises a motor-driven disc having a pattern of comparatively weakly and comparatively strongly X-ray absorbing areas, to be placed with its axis substantially parallel to the axis of an X-ray beam to be emitted by the X-ray source, between the X-ray source and the image intensifier so as to be rotatable about its axis.

Such a method and device are known from Radiology, 1986; 159; 259-263.

The perceptibility of details in an image generated by a radiographic X-ray system is determined inter alia by the contrast generated by absorption of X-rays, by the modulation transfer and the amount of image noise. The modulation transfer for stationary objects is determined by the extent of geometric enlargement in combination with the size of the focus and the modulation transfer of the X-ray detection-image display system. For moving objects the modulation transfer is detrimentally influenced by the movement blur caused by the image-detecting system. Said movement blur, for example, in Fluoroscopic systems, is caused in that the detector requires some time to adapt to a varying X-ray intensity. In this case we refer to the image lag of the X-ray system. However, image lag of an X-ray system not only has a negative influence on the image quality; the image noise decreases due to the integrating action of the slow system. In order to reach in an X-ray system, depending on the speed of an object to be imaged, an optimum compromise between improvement of the contrast of details at shorter image lag on the one hand and reduction of the image noise at longer image lag on the other hand, an objective, reproducible and simple measuring method is required to determine the image lag of X-ray systems in operating conditions.

In order to measure image lag in the known method, a copper disc having slot-shaped apertures in its radial direction and rotating about its axis parallel to the X-ray beam, is arranged between the X-ray source and the image intensifier. By means of a video camera that is coupled to the image intensifier, the image of the rotating disc is displayed on a television monitor as a rotating circle of lines of light. On the track of said circle of lines of light, a photosensitive diode having a small slot-shaped aperture is connected on the display screen of the television monitor parallel to the lines of light, which are visible on the screen. The output signal of the diode is displayed on an oscilloscope with a time base adapted to the frequency of revolution of the disc. The oscilloscope image consists of a stationary periodic series of pulses which decrease in height and which are situated at a distance from each other equal to the inverse of the picture frequency of the television monitor. Within a period on the oscilloscope image, a strong pulse caused by a passing line of light is succeeded by a number of pulses of decreasing height which characterise the image lag of the system. The image lag is now determined from the pulse height ratio of the third "lagging pulse" and the first "light line pulse". The drawback of such a measuring method is that the width of the X-ray-passing slots in the rotating disc is so narrow that in order to visualise them on a television monitor, a contrast adjustment of the television monitor is required which is very unusual for normal operating conditions. The adjustment of contrast and brightness of the television monitor influence the measured image lag. Furthermore, when using the said measuring method, only the image lag for decreasing image intensity measured while the influence of the image lag for increasing image intensity remains unknown.

It is an object of the invention to provide an objective reproducible and accurate measuring method of determining the image lag in X-ray systems in which the measurement takes place under conditions such as they prevail during normal operation and in which the collective influence of the image lag for decreasing and increasing image intensity is determined.

For that purpose the measuring method according to the invention is characterized in that the pattern of the disc comprises at least a coiled comparatively strongly X-ray absorbing area which is coaxial with the disc, that at least one video line, that is situated in a part of the image on which the centre of the disc is displayed, is selected from the video signal produced by the video camera, that the signal amplitude of the selective video line is measured and that the image lag is determined from the ratio of the signal amplitude measured while the disc is stationary and the signal amplitude measured while the disc is rotating at a given speed. The invention is based on the recognition of the fact that over a narrow strip in an image of a perpendicular elevation of a disc rotating about its axis, said disc having a coiled pattern coaxial with the disc, a number of lines more at a uniform speed. Said speed is equal to the product of the distance between two successive coil tracks of the same coil and the frequency of revolution of the disc. By increasing the said distance, the rate of movement can be increased at a given frequency of revolution. By the choice of the material of the X-ray absorbing coiled pattern, the text-object can be made similar to details to be examined occurring in operating conditions, for example, medical details, such as catheters or contrast agents in blood vessels. The X-ray beam, after having passed through the said rotating disc is converted by means of an image intensifier into a light image which is scanned in a line-shaped pattern by a video camera. By means of a selection device one or more video lines can be selected in a part of the image on which the centre of the disc is displayed. The selected video signal is displayed with suitable means, for example, an oscilloscope, and is compared with the video signal measured in a while the disc is stationary. The ratio of the signal amplitude of the video signal, measured while the disc is rotating and measured while the disc is stationary, is a measure of the image lag of the X-ray system. As a measure of the image lag may also be used the frequency of revolution of the disc at which the ratio of the signal amplitude of the video signal measured using a rotating and the signal amplitude measured using a stationary disc, amounts to a given value.

The device according to the invention is characterized in that the pattern of the disc comprises at least a coiled X-ray-absorbing area which is coaxial with the disc and that the measuring device comprises selection means for selecting from the video signal produced by the video camera at least one video line and comprises display means to display the signal amplitude of the selected video line.

A preferred embodiment of the method according to the invention is characterized in that the frequency of revolution of the disc is equal to a whole number of times the quotient of the picture frequency of the video camera and the number of concentric coiled comparatively strongly X-ray absorbing areas present on the disc. As a result of this, a stroboscopic effect is reached which facilitates the reading of the signal amplitude. It is also possible to measure the signal amplitude of each selected video line after averaging the signals associated with corresponding video lines in two or more successive video images. As a result of the said averaging the noise which is present in the video signals disappears away and the accuracy of the amplitude determination increases. If the disc comprises a number of N concentric coiled X-ray absorbing areas the image of the disc is identical for each multiple of 1/N revolutions. By increasing the multiplicity N at a given image frequency of the video camera, a lower rate of revolution will suffice. This is of importance for measuring image lag of systems which are so slow that the rate of movement of the test object may not be so high that the signal amplitude of the video signal becomes too small for accurate measurements.

A further preferred embodiment of the invention is characterized in that the frequency of revolution of the disc is equal to the quotient of the picture frequency of the video camera and the number of concentric coiled comparatively strongly X-ray-absorbing areas present on the disc, divided by a natural number. At a high value of said natural number, D, low rates of revolution which are of importance for measuring comparatively slow systems, can be realised without adapting the multiplicity of the coil. At such low rates of revolution of the disc the signal of a video line in a video image will be identical to the signal of a corresponding video line in each video image which, after D periods of the video signal, or a whole multiplicity thereof, succeeds the first video image. This should be taken into account in an optional averaging of signals associated with corresponding video lines.

Figure 2:
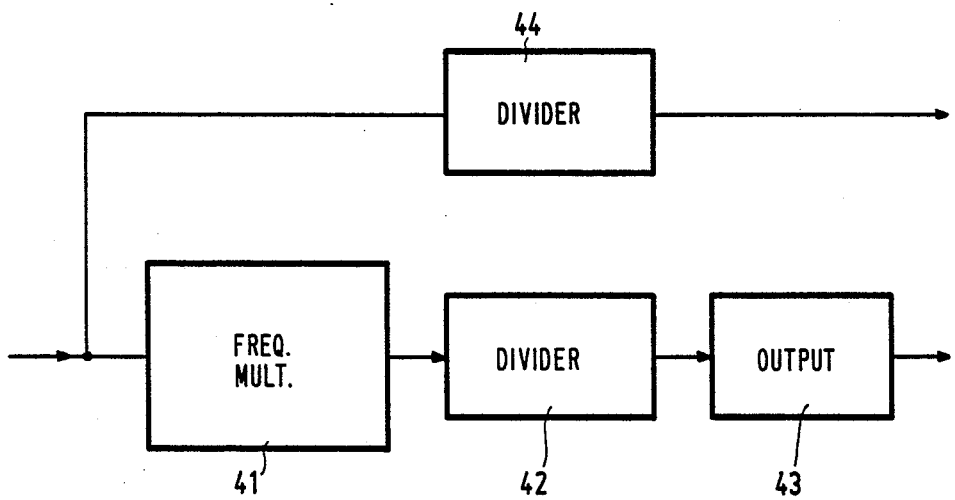
Figure 3:
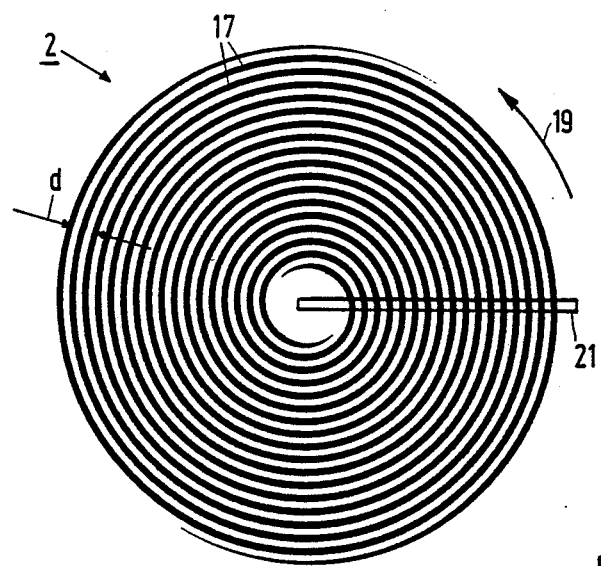
Figure 4:
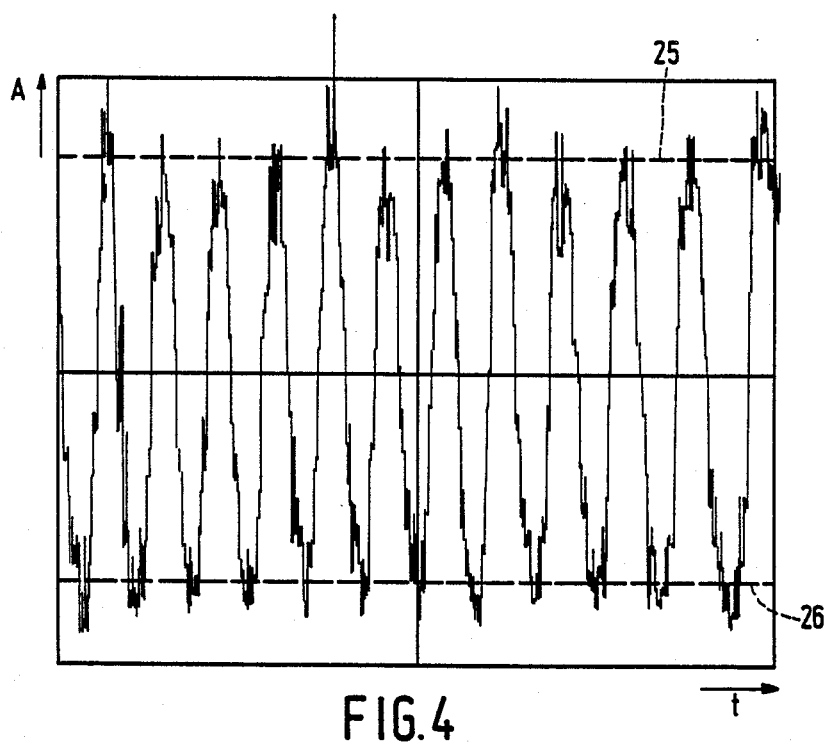
Figure 5:
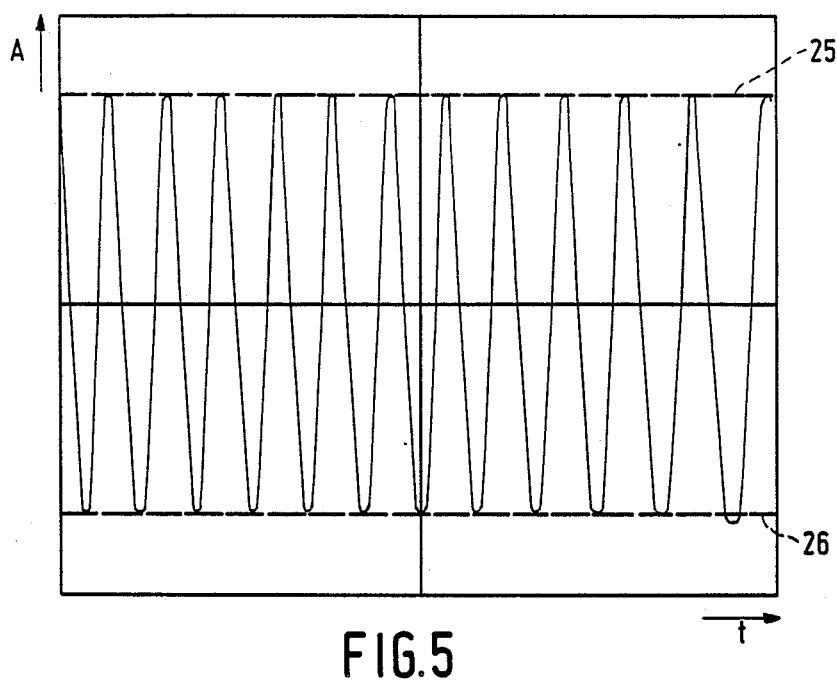
Figure 6:
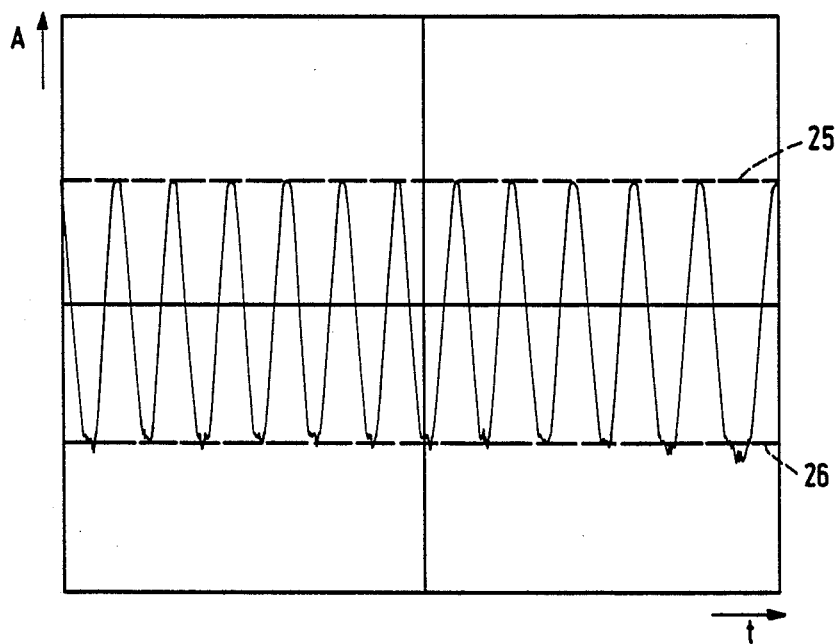

The invention will now be described in greater detail with reference to the accompanying drawing, in which FIG. 1 shows diagrammatically the measuring device, FIG. 2 shows diagrammatically the synchronisation device, FIG. 3 shows a disc having a double coiled X-ray absorbing pattern, FIG. 4 shows an oscilloscope image of the video signal for a stationary disc, FIG. 5 is an oscilloscope image of a video signal averaged over 128 successive periods for a stationary disc, FIG. 6 shows an oscilloscope image of a video signal averaged over 128 successive periods for a rotating disc.

FIG. 1 shows an X-ray system comprising an X-ray source 1, an image intensifier 3 and a video camera 5. A disc 2 having comparatively strongly and comparatively weakly X-ray-absorbing areas is arranged between the X-ray source 1 and the image intensifier 3 in a water-filled basin 4. The materials from which the disc and the water basin are constructed are preferably chosen to be so that the disc placed in the water constitutes a test object which shows an X-ray absorption and scattering corresponding to the human body. The disc 2 can be rotated about its axis which is substantially parallel to the axis of an X-ray beam 6 emitted by the X-ray source 1. The output signal of the video camera 5 is applied to a television monitor 7 on which an image of the disc 2 can be displayed. Said output signal is also applied to a selection device 9—preferably a Philips video line selector, type PM 8917 or a Tektronix digital memory oscilloscope, type 2430 option 5—which selects at least one video line situated in a part of the image on which the centre of the disc 2 is displayed. By means of a synchronisation device 11 a motor 13 (for example, a stepping motor), which drives the disc 2, is controlled so that the frequency of revolution of the disc is equal to a whole multiple of or a factor 1/D times, the quotient of the picture frequency of the video camera 5 and the number of concentric coiled comparatively strongly X-ray-absorbing areas present on the disc. By means of an oscilloscope 15, the time base of which is adapted to the picture frequency of the video camera 5, the amplitude of the video signal which is associated with the selected video line(s), is displayed. A trigger frequency of the oscilloscope 15 is adjusted by the synchronisation device 11. If the frequency of revolution of the disc is a whole multiple of the quotient of the picture frequency and the number of X-ray absorbing areas, the trigger frequency of the oscilloscope 15 is equal to the picture frequency. If the frequency of revolution of the disc is equal to a factor 1/D times the quotient of the picture frequency and the number of X-ray abosrbing areas, the trigger frequency of the oscilloscope 15 is equal to 1/D times the picture frequency. The oscilloscope 15 is preferably a memory oscilloscope which displays the average of the signals which are associated with corresponding video lines in two or more video images which succeed each other with an interim period of D periods—where D may also have the value 1.

FIG. 2 shows diagrammatically the components from which the synchronisation device 11 may be constructed. Said synchronisation device comprises a frequency multiplier 41 which receives at its input a signal of a frequency of 50 Hz and at its output produces a single of a frequency of 1200 Hz. A first adjustable frequency divider 42 divides the output frequency of the frequency multiplier 41 by a value which depends on the rate of revolution to which the motor 13 is to set. An output circuit 43 which comprises a transistor arrangement makes the signal originating from the frequency divider 42 suitable for transmission through a coaxial cable. This signal is supplied to the motor 13. A second adjustable frequency divider 44 also receives a 50 Hz signal at its output and divides the said frequency by the number D. The output signal of the second frequency divider 44 is applied to the trigger input of the oscilloscope 15.

FIG. 3 shows the reproduction 2' of the disc 2 as it is seen on the monitor 7. In this example the disc 2 comprises two coiled X-ray-absorbing areas 17 which are coaxial with the disc. In the image of the disc a strip-shaped part 21 is shown, which extends in the horizontal direction from a point on the left of the centre to a point on the right of the right hand edge of the disc. When the disc rotates in a direction indicated by an arrow 19, dark bands travel over the strip 21 at a uniform speed from the centre towards the edge of the disc. The video lines selected by the selection device 9 are present in the strip 21. The transversal velocity V of the dark bands in the strip 21 is equal to the product of the distance d between two successive coiled tracks of the same coil and the frequency of revolution f: V=d.f. If the rate of revolution of the disc is limited, the transversal velocity V can be increased by increasing the distance d between the spiral tracks. In the space between successive coiled tracks in this example, a second coiled X-ray-absorbing area, which is concentric with the first coil is provided. The image in the strip 21 then is identical after each half revolution of the disc. In order to obtain an image 2' of the disc 2 which apparently is stationary as a result of the stroboscopic effect—which facilitates the reading of the signal amplitude—the rate of revolution of the disc must be equal to half the picture frequency, or to a whole multiple of half the picture frequency of the video camera 5. The rate of revolution of the disc 2 at a given picture frequency may be reduced inversely proportionally with the number—in this case two—of coaxial coiled areas. As a result of this, the transversal velocity V decreases at a given distance d between successive tracks of the same coil. This is of importance in measuring the image lag of slow systems which, at too high a transversal velocity, produce a signal which is too small for accurate measurement.

FIG. 4 shows an oscilloscope image of the signal of a video line present in the strip 21 while the disc is stationary. The video signal A is plotted on the vertical axis and the time t is plotted on the horizontal axis. The amplitude of the video signal is the distance between an upper signal level 25 and a lower signal level 26. As a result of the noise present in the signal said signal levels are poorly defined, which impedes the determination of amplitude. The determination of the amplitude of the video signal is further impeded in that the signal of a single video line on an analog oscilloscope has a very low intensity. When a few successive video lines are selected in the strip 21 by means of the selection device 9, the brightness of the oscilloscope image increases. The signals of the video lines present in the selected part of the strip 21 should be substantially equal. For that purpose the selected part of the strip 21 must be very narrow with respect to the dimension of the disc 2. The number of selected video lines then is a very small fraction of the number of lines per image.

A reproducible reading of the amplitude of the video signal is further impeded by the constant movement of the oscilloscope image. By adapting the frequency of revolution of the disc 2 to the picture frequency of the video camera 5, a stationary oscilloscope image can be obtained due to the above described stroboscopic effect, which makes the disc seem stationary. This facilitates the amplitude determination and also provides a possibility of suppressing the noise, so that the signal levels 25 and 26 are better defined, as a result of which the signal amplitude can be more accurately determined. For this purpose the video signal is averaged over a number of successive picture periods. Since the statistic fluctuations (noise) are substantially averaged away a more accurate amplitude determination is possible.

FIG. 5 shows an oscilloscope image of a video signal averaged over 128 successive periods of a video line situated in the strip 21 measured using a stationary disc.

FIG. 6 shows an oscilloscope image of the video signal of a video line situated in the strip 21, averaged over 128 successive periods, using a rotating disc, the frequency of revolution of which is adapted in the above described manner to the frequency of the video camera. The signal amplitude s 63% of the signal amplitude of the signal as shown in FIG. 4, that is measured using a stationary disc. The image lag of the X-ray signal is quantified by comparing the amplitude of the signal measured while the disc is rotating and the amplitude measured while the disc is stationary. This may be done, for example, in per cent with a defined rate of revolution. The rate of revolution at which the amplitude of the signals has decreased to a given percentage could also be determined. For an unambiguous quantitive determination of the image lag, the rate of revolution, the relative signal decrease and the X-ray conditions should be fixed.

In the above further explanation of the invention, the display means for displaying the video signals in a preferred embodiment according to the invention are formed by an oscilloscope. The display means, however, may also be formed, for example, by a volt meter or an analog-to-digital converter, the digital output signal of which is processed by a computer.

I claim:

1. A method of measuring image lag in an X-ray system comprising an X-ray source, an image intensifier and a video camera, in which a disc having a pattern of comparatively strongly and comparatively weakly X-ray-absorbing areas is placed between the X-ray source and the image intensifier with its axis substantially parallel to the axis of an X-ray beam emitted by the X-ray source, which disc is made to rotate about its axis, and in which the image lag of the X-ray system is determined from the output signal of the video camera, characterized in that the pattern of the disc comprises at least a coiled comparatively strongly X-ray-absorbing area which is coaxial with the disc, that at least one video line, that is situated in a part of the image on which the centre of the disc is displayed, is selected from the video signal produced by the video camera that the signal amplitude of the selected video line is determined, and that the image lag is measured from the ratio of the signal amplitude measured while the disc is stationary and the signal amplitude measured while the disc is rotating at a given speed.

2. A method as claimed in claim 1, characterized in that the frequency of revolution of the disc is equal to a whole number of times the quotient of the image frequency of the video camera and the number of concentric coiled comparatively strongly X-ray absorbing areas present on the disc.

3. A method as claimed in claim 1 or 2, characterized in that the signal amplitude of each selected video line is measured after averaging the signals associated with corresponding video lines in two or more successive video images.

4. A method as claimed in claim 1, characterized in that the frequency of revolution of the disc is equal to the quotient of the picture frequency of the video camera and the number of concentric coiled comparatively strongly X-ray-absorbing areas present on the disc, divided by a natural number.

5. A measuring device for measuring image lag in an X-ray system which comprises an X-ray source, an image intensifier and a video camera, which measuring device comprises a motor-driven disc which has a pattern of comparatively strongly and comparatively weakly X-rayabsorbing areas and which is rotatable about its axis and is to be placed with its axis substantially parallel to the axis of an X-ray beam to be transmitted by the X-ray source, between the X-ray source and the image intensifier, characterized in that the pattern of the disc comprises at least a coiled X-ray absorbing area which is coaxial with the disc and that the measuring device comprises selection means for selecting from the video signal produced by the video camera at least one video line and comprises display means to display the signal amplitude of the selected video line.

6. A measuring device as claimed in claim 5, characterized in that the measuring device comprises a synchronisation device which is constructed to control the motor in such a manner that the frequency of revolution of the disc is equal to a whole number of times the quotient of the picture frequency of the video camera and the number of concentric coiled comparatively strongly X-ray absorbing areas present on the disc.

7. A measuring device as claimed in claim 5, characterized in that a device for determining the average of the signals which are associated with corresponding video lines in two or more successive video images is present between the selection means and the display means.

8. A measuring device as claimed in claim 5, characterized in that the disc is placed in a water-filled basin.

* * * * *